(12) United States Patent
Bowdle

(10) Patent No.: US 10,794,794 B2
(45) Date of Patent: Oct. 6, 2020

(54) FLOW CONDITIONER

(71) Applicant: Lockheed Martin Corporation, Bethesda, MD (US)

(72) Inventor: Donald Eugene Bowdle, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 239 days.

(21) Appl. No.: 16/053,512

(22) Filed: Aug. 2, 2018

(65) Prior Publication Data

US 2020/0041375 A1 Feb. 6, 2020

(51) Int. Cl.
*G01M 9/04* (2006.01)
*F15D 1/02* (2006.01)
*G01M 9/06* (2006.01)

(52) U.S. Cl.
CPC .............. *G01M 9/04* (2013.01); *F15D 1/025* (2013.01); *G01M 9/065* (2013.01)

(58) Field of Classification Search
CPC . F15D 1/025; F15D 1/00; F15D 1/002; F15D 1/06; F15D 1/12; F15D 1/0055; F15D 1/004; F15D 1/02; G01M 9/04; G01M 9/065; G01M 9/062; G01M 9/06; G01M 9/00; G01M 9/02; G01M 9/08; F16L 55/027; F16L 55/02709; F16L 55/02718; F16L 55/02727; G01F 1/40; G01F 1/42; G01F 1/363; E21B 34/02; F02C 7/04; G05D 7/0186
USPC ...... 73/147, 118.03, 861.52; 138/44, 40, 42, 138/39; 210/806, 448, 497.3
See application file for complete search history.

(56) References Cited

U.S. PATENT DOCUMENTS

| 2,123,662 | A | * | 7/1938 | Gwynne | ................. | F16K 17/16 |
| | | | | | | 220/89.2 |
| 2,491,796 | A | * | 12/1949 | Baume | ................... | B01D 35/02 |
| | | | | | | 210/448 |
| 2,805,571 | A | | 9/1957 | Graham | | |
| 3,109,459 | A | * | 11/1963 | Lee, II | ............. | F16L 55/02709 |
| | | | | | | 138/40 |
| 3,602,920 | A | | 9/1971 | Davis et al. | | |
| 3,747,598 | A | | 7/1973 | Cowans | | |
| 3,835,703 | A | | 9/1974 | Bush | | |

(Continued)

FOREIGN PATENT DOCUMENTS

JP          6014121 A      1/1985

*Primary Examiner* — John Fitzgerald
*Assistant Examiner* — Truong D Phan
(74) *Attorney, Agent, or Firm* — Baker Botts L.L.P.

(57) ABSTRACT

According to certain embodiments, a device for conditioning a flow of air includes a casing with an inlet and an outlet. The device has a flow conditioner disposed within the casing and concentrically aligned with the casing. The flow conditioner has a cylindrical portion and a domed end portion capping the cylindrical portion. The flow conditioner forms an annulus region between the flow conditioner and the casing. The flow conditioner also forms a mixing chamber interior to the flow conditioner. The flow conditioner also has a plurality of holes throughout the flow conditioner that are configured to permit air to pass from the inlet of the casing and the annulus into the mixing chamber. The device also has a flow straightener located at the outlet of the casing configured to straighten the airflow as it flows from the mixing chamber out of the device.

20 Claims, 4 Drawing Sheets

(56) References Cited

U.S. PATENT DOCUMENTS

| | | | |
|---|---|---|---|
| 4,198,220 A | 4/1980 | Keller | |
| 5,253,517 A * | 10/1993 | Molin | G01F 1/6842 |
| | | | 73/114.32 |
| 5,341,848 A | 8/1994 | Laws | |
| 5,392,815 A | 2/1995 | Stuart | |
| 5,495,872 A | 3/1996 | Gallagher et al. | |
| 5,501,101 A | 3/1996 | Purcell | |
| 5,762,107 A | 6/1998 | Laws | |
| 5,874,050 A * | 2/1999 | Matias | A61L 9/16 |
| | | | 392/465 |
| 6,145,544 A | 11/2000 | Dutertre et al. | |
| 6,694,808 B2 | 2/2004 | Sawada et al. | |
| 7,249,614 B2 | 7/2007 | Vakili | |
| 7,762,074 B2 * | 7/2010 | Bland | F23R 3/04 |
| | | | 60/752 |
| 7,992,454 B2 | 8/2011 | Purdy et al. | |
| 8,182,702 B2 * | 5/2012 | Al-Sannaa | B01D 35/02 |
| | | | 210/448 |
| 9,114,874 B1 * | 8/2015 | Danto | B64C 25/36 |
| 9,625,293 B2 * | 4/2017 | Sawchuk | G01F 1/40 |
| 9,885,375 B2 * | 2/2018 | Reiss | F15D 1/025 |
| 10,378,566 B2 * | 8/2019 | Kumar | F15D 1/025 |
| 2004/0069704 A1 * | 4/2004 | Yamaguchi | F02M 61/165 |
| | | | 210/497.01 |
| 2005/0205147 A1 * | 9/2005 | Sawchuk | F15D 1/02 |
| | | | 138/39 |
| 2008/0250854 A1 | 10/2008 | Ding | |
| 2009/0173405 A1 * | 7/2009 | Denzler | E03C 1/08 |
| | | | 138/41 |
| 2010/0044522 A1 | 2/2010 | Siercke et al. | |
| 2011/0011478 A1 | 1/2011 | Chalupa et al. | |
| 2011/0174408 A1 * | 7/2011 | Lundberg | F15D 1/001 |
| | | | 138/39 |
| 2012/0024985 A1 * | 2/2012 | Johnson | F23R 3/286 |
| | | | 239/518 |
| 2014/0062232 A1 * | 3/2014 | Cocks | H02K 9/06 |
| | | | 310/59 |
| 2016/0238046 A1 * | 8/2016 | Reiss | F15D 1/025 |
| 2016/0334249 A1 * | 11/2016 | Sawchuk | G01F 1/40 |
| 2018/0050276 A1 * | 2/2018 | Romanenko | G01M 9/02 |
| 2018/0266094 A1 * | 9/2018 | Priester | E03F 5/06 |
| 2018/0306216 A1 * | 10/2018 | Heizenroeder | G01F 1/58 |

\* cited by examiner

FLOW CONDITIONER

TECHNICAL FIELD

The invention relates generally to a device for producing a uniform flow field from a highly distorted airflow with minimal pressure loss through the device.

BACKGROUND

A mass flow plug measurement device is commonly used in wind tunnel testing to measure the mass flow rate of air through various models to determine the aerodynamic properties of that model based on the position of the mass flow plug. However, highly distorted air flow entering the mass flow plug, as may be typical at the outlet of a wind tunnel model during actual testing, may distort the measured mass flow rate from the actual mass flow rate. Calibration of a mass flow plug occurs in a special calibration facility which provides uniform flow that is dissimilar to the airflow of actual testing in a wind tunnel with a model. A multi-probe total pressure rake and a ring of wall static pressure ports are conventionally used to account for the differences caused by the distorted airflow during actual testing. The multi-probe total pressure rake and wall static pressure ports may not be able to fully account for more extreme distorted air flow operating conditions of a model in the wind tunnel.

SUMMARY OF THE DISCLOSURE

According to certain embodiments, a device for conditioning a flow of air includes a casing with an inlet and an outlet. The device has a flow conditioner disposed within the casing and concentrically aligned with the casing. The flow conditioner has a cylindrical portion and a domed end portion capping the cylindrical portion. The flow conditioner forms an annulus region between the flow conditioner and the casing. The flow conditioner also forms a mixing chamber interior to the flow conditioner. The flow conditioner also has a plurality of holes throughout the flow conditioner that are configured to permit air to flow from the inlet of the casing and the annulus into the mixing chamber. The device also has a flow straightener located at the outlet of the casing that is configured to straighten the airflow as it flows from the mixing chamber out of the device.

According to certain embodiments, an aerodynamics testing apparatus includes a wind tunnel inlet model, an airflow smoothing device, and a mass flow plug measurement device. The wind tunnel model has an inlet and an outlet that supplies a flow of air at the outlet. The airflow smoothing device includes a casing with an inlet and an outlet. The device has a flow conditioner disposed within the casing and concentrically aligned with the casing. The flow conditioner has a cylindrical portion and a domed end portion capping the cylindrical portion. The flow conditioner forms an annulus region between the flow conditioner and the casing. The flow conditioner also forms a mixing chamber interior to the flow conditioner. The flow conditioner also has a plurality of holes throughout the flow conditioner that are configured to permit air to flow from the inlet of the casing and the annulus into the mixing chamber. The device also has a flow straightener located at the outlet of the casing that is configured to straighten the airflow as it flows from the mixing chamber out of the device. The mass flow plug measurement device receives the smoothed airflow from the outlet of the casing.

According to certain embodiments, a device includes a casing and a flow conditioner. The casing has an inlet and an outlet and is configured to receive an airflow at the inlet and then output a smoothed airflow at the outlet. The flow conditioner is disposed within the casing and has a cylindrical portion with a first and a second end, a domed end portion proximate the inlet of the casing and that caps the first end of the cylindrical portion, a mixing chamber that is formed by interior portions of the cylindrical and domed end portions, and a plurality of apertures formed within the cylindrical and domed end portions that permit air to pass from the inlet into the mixing chamber.

Certain embodiments may provide one or more technical advantages. As an example, certain embodiments provide advantages for allowing mass flow plug calibration over the full operating range of the plug position enabling more accurate measurements during aerodynamics testing. As another example, certain embodiments provide advantages for enabling the mass flow plug calibration to be valid for a wide range of inlet model orientations and conditions (e.g., alpha, beta, Mach) that ordinarily cause flow distortion patterns to be discharged from the inlet model. Certain embodiments may include all, some, or none of the above-described advantages. Other advantages will be apparent to those of ordinary skill in the art.

BRIEF DESCRIPTION OF THE DRAWINGS

For a more complete understanding of the present disclosure, reference is now made to the following description, taken in conjunction with the accompanying drawings, in which.

DETAILED DESCRIPTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Highly distorted air flow is typically discharged from certain types of wind tunnel inlet models into a mass flow plug measurement device. This highly distorted flow field is not ideal when using a mass flow plug calibrated under uniform flow field conditions. As a result, the measured data when testing a model in a wind tunnel that results in a highly distorted flow field may be inaccurate or wholly invalid. The disclosed device to condition the flow field may result in more accurate measured data during wind tunnel testing. The disclosed device may also provide the advantage of enabling the mass flow plug calibration to be valid over the full operating range of plug positions. The resulting conditioned airflow at the outlet of the airflow smoothing device may improve the accuracy of aerodynamics test results.

Figure 1:
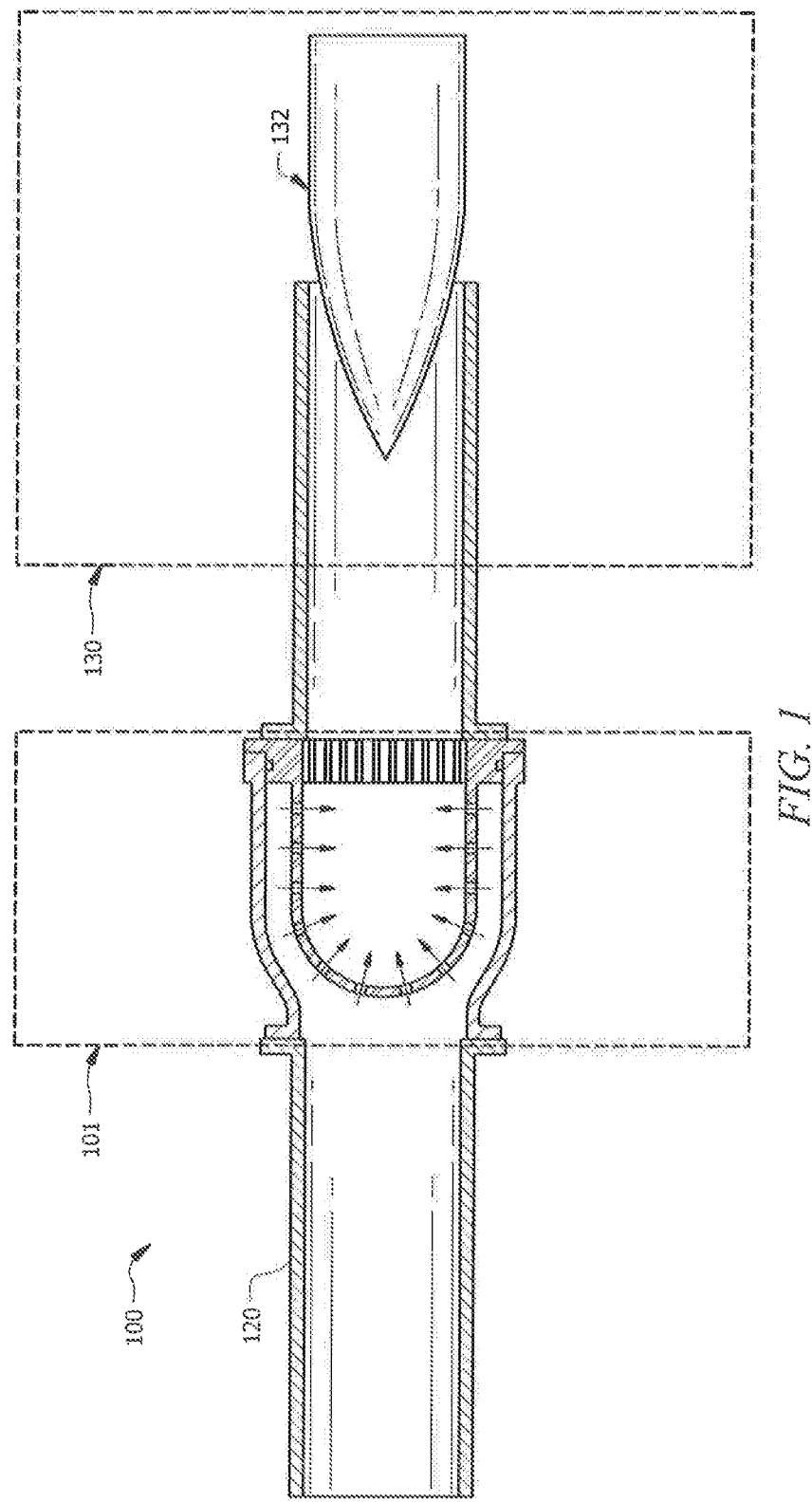
FIG. 1 illustrates an example embodiment of a flow conditioning device incorporated into an aerodynamics testing apparatus.

FIG. 1 illustrates an example embodiment of an airflow smoothing device 101 incorporated into an aerodynamics testing apparatus 100. Certain features of airflow smoothing device 101 are shown and described in further detail with respect to FIGS. 2-4. As illustrated, a flow of air may be supplied to the airflow smoothing device 101 from discharge source 120. In certain embodiments, discharge source 120 may be a discharge from a wind tunnel inlet model. In some embodiments, discharge source 120 may include a flow distortion plate and flow distortion plate holder for purpose of calibrating a mass flow measurement device 130. As the air exists the wind tunnel discharge source 120 it passes through the airflow smoothing device 101 into the mass flow measurement device 130. The pathway of the airflow within the airflow smoothing device 101 will be described in greater detail with respect to FIG. 3.

After passing through airflow smoothing device 101, the flow of air will have a more uniform flow field as it reaches the mass flow measurement device 130. The advantage of this is to improve the reading from mass flow measurement device 130. Mass flow measurement devices, such as the one illustrated in FIG. 1, correlate the corrected mass flow rate of the air passing by a mass flow plug 132 based on the position of mass flow plug 132 within mass flow measurement device 130. However, highly distorted air flow without a uniform flow profile may cause the true corrected airflow to differ from the corrected airflow determined during mass flow plug calibration for a given mass flow plug 132 position.

Figure 2:
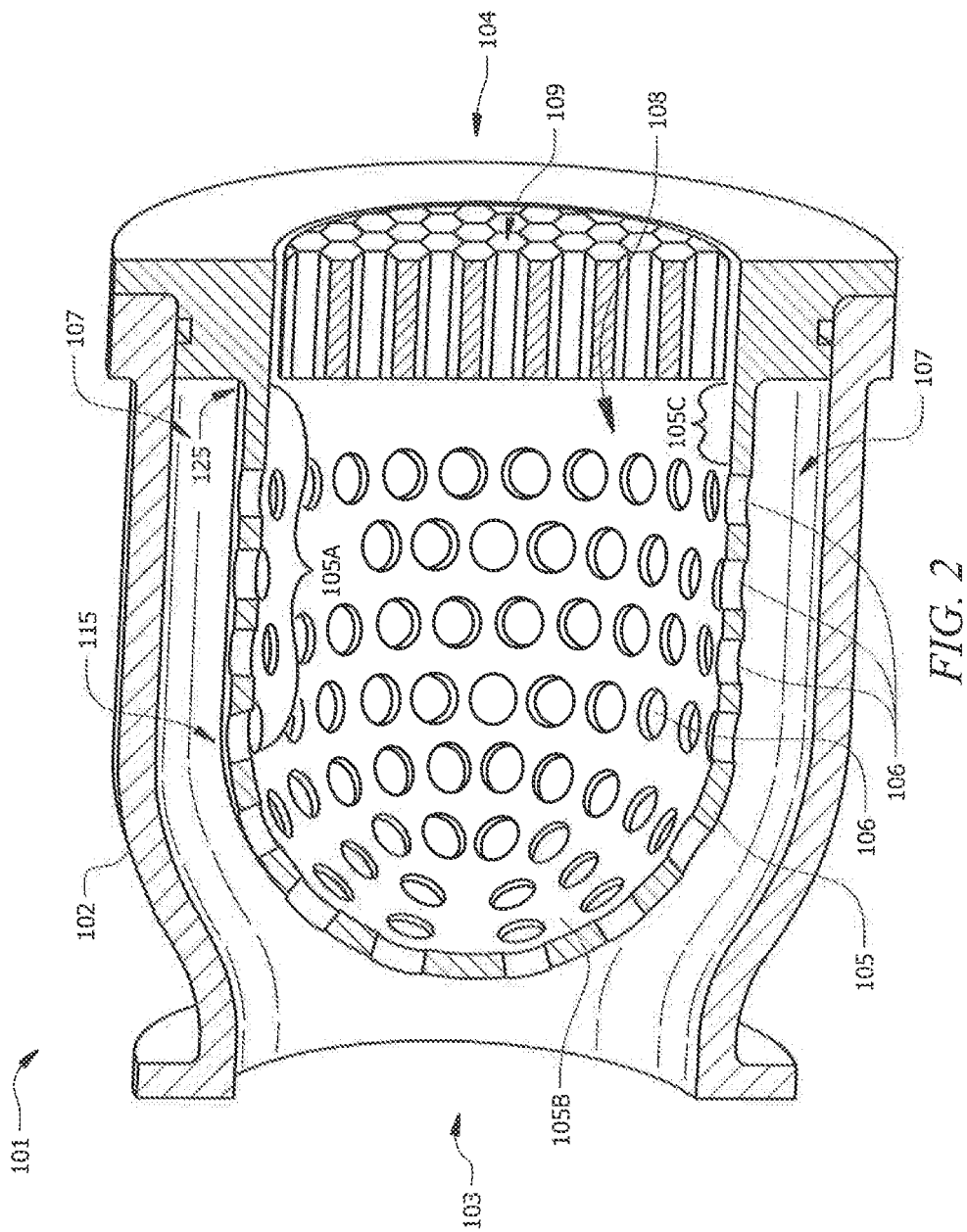
FIG. 2 illustrates a cut-away view of the example flow conditioning device of FIG. 1.

FIG. 2 illustrates the airflow smoothing device 101 of FIG. 1 in greater detail. In some embodiments, airflow smoothing device 101 includes three major components: a casing 102, a flow conditioner 105, and a flow straightener 109. Casing 102 encloses both flow conditioner 105 and flow straightener 109. Casing 102 has an inlet 103 and the flow straightener 109 constitutes the outlet 104 of the device. Inlet 103 is configured to receive an airflow, such as an airflow that may be provided from a wind tunnel inlet model. Flow straightener 109 is located at outlet 104 and may span the full cross section of outlet 104 such that all of the air output by the flow smoothing device 101 must pass through flow straightener 109 when discharged from casing 102. In certain embodiments, inlet 103 and outlet 304 of flow straightener 109 may have the same interior diameter. In certain other embodiments, inlet 103 may have the same interior diameter of flow conditioner 105.

In some embodiments, flow conditioner 105 of flow smoothing device 101 is concentrically aligned with casing 102 and flow straightener 109. Flow conditioner 105 includes a domed end portion 105E and a cylindrical portion 105A. Cylindrical portion 105A may have a first end 115 and a second end 125, first end 115 located proximate to inlet 103 of casing 102 and second end 125 located proximate to outlet 104 of casing 102. Domed portion 105B is located at the first end 115 of cylindrical portion 105A. The interior cavity of the flow conditioner 105 defines a mixing chamber 108 enclosed by the interior walls of cylindrical portion 105A, domed end portion 105E and flow straightener 109. Flow conditioner 105 also forms an annulus region 107 between the exterior diameter of cylindrical portion 105A and the interior diameter of casing 102.

Flow conditioner 105 includes a plurality of holes 106 formed within cylindrical portion 105A and domed end portion 105B. Holes 106 may be any shape of aperture and may be any appropriate size and are not limited to round holes as illustrated. Holes 106 may also be any appropriate number of holes 106. In certain embodiments flow conditioner 105 has at least two hundred holes 106. Holes 106 may be configured to allow air to flow from inlet 103 of the casing 202 and annulus 107 into mixing chamber 108. Additional detail regarding the flow path of air within flow smoothing device 101 will be described in greater detail with respect to FIG. 3. In certain embodiments cylindrical portion 105A may have a region 105C proximate second end 125 that does not have any holes 106. Additional details of flow conditioner 105 are shown and described with respect to FIG. 4.

Figure 3:
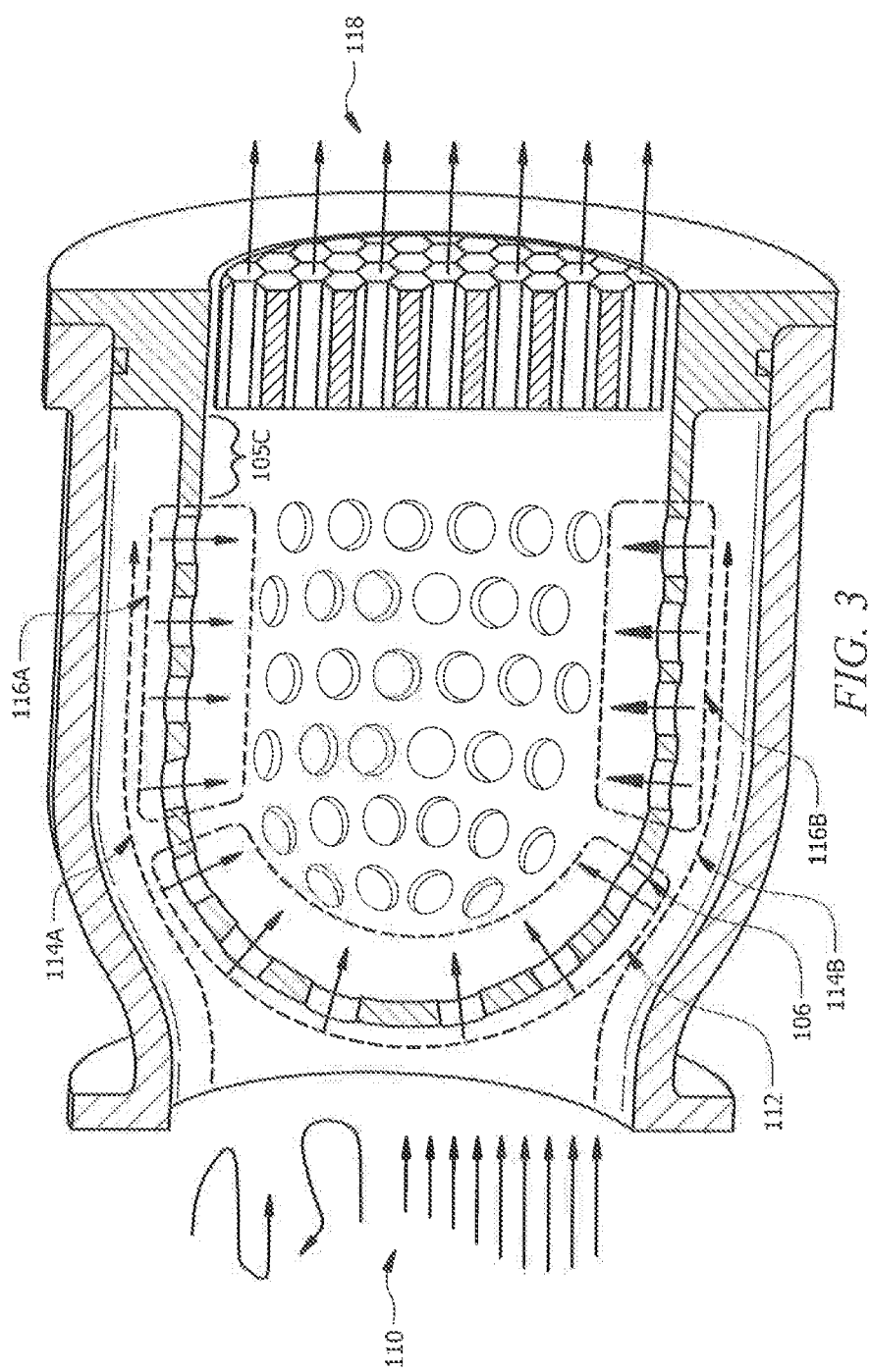
FIG. 3 illustrates the example flow conditioning device of FIGS. 1-2 with superimposed streamlines illustrating example air flow paths.

FIG. 3 illustrates the flow smoothing device 101 of FIGS. 1-2 with flow streamlines 110-118 superimposed on the illustration. Reference may be made to FIG. 2 for reference numerals not reproduced in FIG. 3 for clarity. An airflow 110 may be received by the flow smoothing device 101 at inlet 103 of casing 102. Received airflow 110 may be highly distorted as indicated by certain streamlines not oriented in a uniform direction, without a uniform velocity, and without a uniform total pressure.

After entering inlet 103 of casing 102, a portion of received airflow 110 may proceed to pass directly through holes 106 of domed end portion 105B and enter mixing chamber 108 as direct airflow 112. In certain embodiments, a minority portion of the received airflow 110 will pass through the holes 106 located about domed end portion 105B as direct airflow 112. Rather, the majority of the received airflow 110 may pass around the exterior of domed end portion 105B and enter annulus 107 as transverse airflow 114. This transverse airflow 114 may be considered separately as upper transverse airflow 114A and lower transverse airflow 144B. Highly distorted air flow 110 may generate a large disparity between upper transverse airflow 114A and lower transverse airflow 114B.

Both upper transverse airflow 114A and lower transverse airflow 114B that passes through the annulus will then be directed into mixing chamber 108 through holes 106 of cylindrical portion 105A. Because the holes 106 of cylindrical portion 105A are perpendicular to the concentric axis of casing 102 and flow conditioner 105, in some embodiments, the air entering the mixing chamber 108 from cylindrical portion 105A will result in a substantially perpendicular flow path with respect to a hypothetical flow path directly between inlet 103 to outlet 104 of casing 102. The airflow passing through holes 106 from upper transverse airflow 114A and lower transverse airflow 114B enters mixing chamber 108 as upper cross airflow 116A and lower cross airflow 116B, respectively.

Both upper cross airflow 116A and lower cross airflow 116B will impinge direct airflow 112 causing the air entering mixing chamber 108 to redistribute into a more uniform flow. It may also be appreciated that lower cross airflow 116B may have a higher velocity than upper cross airflow 116A resulting from the flow rate of lower transverse airflow 114B being greater than the flow rate of upper transverse airflow 114A. The cross airflows 116A and 116B are diametrically opposed and will interact with each other and redistribute more uniformly from top to bottom within mixing chamber 108 as a result of the difference in velocity at holes 106.

After redistributing more uniformly within mixing chamber 108, the air will pass through flow straightener 109. Flow straightener 109 will receive the uniformly distributed air within mixing chamber 108 and eliminate any remaining radial velocity component of the air as it exits the flow smoothing device 101 as smoothed discharge air 118. Flow straightener 109 is illustrated in FIGS. 1-3 as a conventional honeycomb flow straightener, but it should be understood by one of ordinary skill in the art that any flow straightening device may be employed as flow straightener 109.

Figure 4:
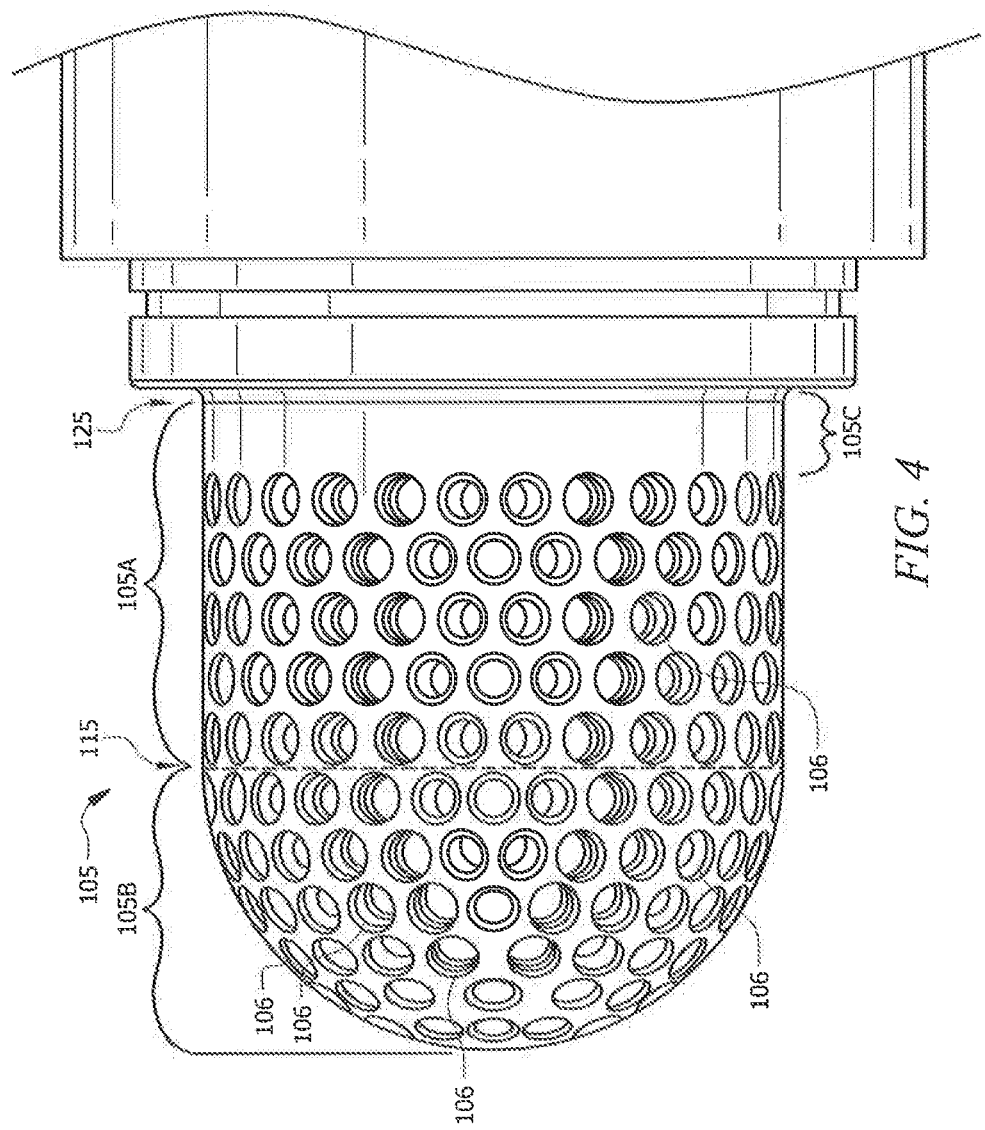
FIG. 4 illustrates a flow conditioner component of the example flow conditioning device of FIGS. 1-3.

FIG. 4 illustrates further detail of the flow conditioner 105 as described and illustrated in FIGS. 2-3. In certain embodiments, flow conditioner 105 has two portions: a domed end portion 105B that is proximate to a first end 115 of a cylindrical portion 105A. A number of holes 106 are distributed throughout domed end portions 105B and cylindrical portion 105A. In certain embodiments, flow conditioner 105 may have at least two hundred holes 106. In some embodiments, the length of cylindrical portion 105A may be sized to have a larger surface area than domed end portion 105B and therefore accommodate a greater number of holes 106 relative to domed end portion 105B. In certain embodiments, however, cylindrical portion 105A may have a region 105C about the second end 125 of the cylindrical portion 105A that is devoid of any holes 106. Region 105C may be sized such that the holes 106 closest to the flow straightener 109 are set back a particular distance. This distance may be determined so that air may be distributed to the perimeter of flow straightener 109 and that holes 106 closest to flow straightener 109 do not drive an undesirable amount of air away from the perimeter of flow straightener 109. For example, region 105C may extend a length of three-eighths of an inch from second end 125 of cylindrical portion 105A.

The diameter of holes 106 may be based on a size determined to best distribute the air entering mixing chamber 108. For example, holes 106 may have diameters between one-eighth of an inch to five thirty-seconds of an inch, however, any diameter may be used. In some embodiments, holes 106 may be equally sized. The sizing of holes 106 may also be determined so as to minimize the pressure loss across flow smoothing device 101. In certain embodiments, holes 106 may have a larger opening diameter than the diameter at the inside of flow conditioner 105 exposed to mixing chamber 108. For example, holes 106 may be chamfered at the opening to draw in air more easily and may not be chamfered at mixing chamber 108 side so that the air passing through holes 106 enter mixing chamber 108 as a jet.

Holes 106 may be distributed throughout flow straightener 105 in any pattern. In certain embodiments, holes 106 may be uniformly distributed throughout flow straightener 105. In some embodiments, holes 106 may be located such that the spacing between the holes 106 ranges from twice the diameter of holes 106 to 1.6 times the diameter of holes 106. In certain other embodiments, the distribution of holes 106 may favor cylindrical portion 105A to reduce the amount of direct airflow 112 entering mixing chamber 108 in relation to the amount of cross airflow 116A, 116B.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A device comprising:
    a casing comprising an inlet and an outlet, the casing configured to receive an airflow at the inlet and output the airflow from the outlet;
    a flow conditioner disposed within the casing, the flow conditioner being concentrically aligned with the casing, the flow conditioner comprising:
        a cylindrical portion comprising a first end and a second end;
        a domed end portion capping the first end of the cylindrical portion, the domed end portion located proximate to the inlet of the casing;
        an annulus region formed at least partially by exterior portions of the cylindrical portion and interior portions of the casing;
        a mixing chamber formed at least partially by interior portions of the cylindrical portion and the domed end portion;
        a plurality of holes formed within the cylindrical portion and the domed end portion, the plurality of holes configured to permit the airflow to pass from the inlet into the mixing chamber; and
    a flow straightener located proximate to the second end of the cylindrical portion, the second end being opposite to the first end, the flow straightener configured to straighten the airflow as it flows from the mixing chamber to the outlet of the casing.

2. The device of claim 1, wherein the plurality of holes have diameters between one-eighth of an inch to five thirty-seconds of an inch.

3. The device of claim 1, wherein the holes decrease in diameter in a direction from an outside of the flow conditioner towards the mixing chamber.

4. The device of claim 1, wherein the plurality of holes are configured to minimize pressure loss within the device.

5. The device of claim 1, wherein plurality of holes comprises at least two hundred holes.

6. The device of claim 1, wherein the inlet of the casing is configured to receive the airflow from a wind tunnel inlet model and the outlet of the casing is configured to discharge the airflow into a mass flow plug measurement device.

7. The device of claim 1, wherein the cylindrical portion of the flow conditioner comprises a region that is devoid of any of the plurality of holes, the region extending at least three-eighths of an inch from the second end of the cylindrical portion towards the first end.

8. The device of claim 1, wherein the flow straightener comprises a honeycomb flow straightener.

9. The device of claim 1, wherein the plurality of holes are equally sized.

10. The device of claim 9, wherein the spacing of the plurality of holes ranges from twice the diameter of the holes to 1.6 times the diameter of the holes.

11. The device of claim 1, wherein a length of the cylindrical portion is sized in relation to the domed end portion such that a majority of the airflow entering the mixing chamber passes from the annulus region through the plurality of holes located in the cylindrical portion of the body rather than the plurality of holes located in the domed end portion.

12. The device of claim 11, wherein the plurality of holes formed within the cylindrical portion of the flow conditioner are oriented perpendicular to the concentric axis of the device such that a majority of the airflow entering the mixing chamber is not directed toward the inlet of the casing and is not directed toward the outlet of the casing.

13. An aerodynamics testing apparatus comprising:
a wind tunnel inlet model having an inlet and an outlet, the wind tunnel inlet model supplying a flow of air at the outlet of the wind tunnel inlet model;
an airflow smoothing device comprising:
   a casing comprising an inlet and an outlet, the inlet of the casing configured to receive the flow of air supplied from the outlet of the wind tunnel inlet model, the outlet of the casing configured to output a smoothed airflow at the outlet of the casing;
   a flow conditioner disposed within the casing, the flow conditioner being concentrically aligned with the casing, the flow conditioner comprising:
      a cylindrical portion comprising a first end and a second end;
      a domed end portion capping the first end of the cylindrical portion, the domed end portion located proximate to the inlet of the casing;
      an annulus region formed at least partially by exterior portions of the cylindrical portion and interior portions of the casing;
      a mixing chamber formed at least partially by interior portions of the cylindrical portion and the domed end portion; and
      a plurality of holes formed within the cylindrical portion and the domed end portion, the plurality of holes configured to permit the airflow to pass from the inlet into the mixing chamber;
   a flow straightener located proximate to the second end of the cylindrical portion, the second end being opposite to the first end, the flow straightener configured to straighten the airflow as it flows from the mixing chamber to the outlet of the casing; and
a mass flow plug measurement device, the mass flow plug measurement device configured to receive the smoothed airflow from the outlet of the casing.

14. The aerodynamics testing apparatus of claim 13, wherein the plurality of holes comprises at least two hundred holes.

15. The aerodynamics testing apparatus of claim 13, wherein the holes are sized to minimize pressure loss within the device and the holes are spaced between twice the diameter of the holes and 1.6 times the diameter of the holes.

16. The aerodynamics testing apparatus of claim 13, wherein a length of the cylindrical portion is sized in relation to the domed end portion such that a majority of the airflow entering the mixing chamber passes from the annulus region through the plurality of holes located in the cylindrical portion of the body rather than the plurality of holes located in the domed end portion.

17. The aerodynamics testing apparatus of claim 13, wherein the plurality of holes formed within the cylindrical portion of the flow conditioner are oriented perpendicular to the concentric axis of the device such that a majority of the airflow entering the mixing chamber is not directed toward the inlet of the casing and is not directed toward the outlet of the casing.

18. A device comprising:
   a casing comprising an inlet and an outlet, the casing configured to receive an airflow at the inlet and output the airflow from the outlet;
   a flow conditioner disposed at least partially within the casing, the flow conditioner comprising:
      a cylindrical portion comprising a first end and a second end;
      a domed end portion capping the first end of the cylindrical portion, the domed end portion located proximate to the inlet of the casing;
      a mixing chamber formed at least partially by interior portions of the cylindrical portion and the domed end portion; and
      a plurality of apertures formed within the cylindrical portion and the domed end portion, the plurality of apertures configured to permit the airflow to pass from the inlet into the mixing chamber.

19. The device of claim 18, wherein the plurality of apertures are configured to minimize pressure loss within the device.

20. The device of claim 18, wherein the plurality of apertures formed within the cylindrical portion of the flow conditioner are oriented perpendicular to the concentric axis of the device such that a majority of the airflow entering the mixing chamber is not directed toward the inlet of the casing and is not directed toward the outlet of the casing.

* * * * *